United States Patent [19]

Laflamme

[11] 4,048,634
[45] Sept. 13, 1977

[54] ELECTRONIC KEYBOARD DISPLAY DEVICE

[76] Inventor: Daniel Laflamme, 157 Desmarchais Blvd., Verdun, Quebec, Canada

[21] Appl. No.: 735,819

[22] Filed: Oct. 26, 1976

[51] Int. Cl.$^2$ .................. G09B 13/00; G09B 15/08
[52] U.S. Cl. .................................. 340/337; 84/478; 35/6; 340/365 R
[58] Field of Search ............... 84/478, 470; 35/5, 6; 340/365 R, 365 C, 311, 324 R, 324 M, 337

[56] References Cited

U.S. PATENT DOCUMENTS

| | | | |
|---|---|---|---|
| 3,446,109 | 5/1969 | Scott et al. | 84/478 |
| 3,482,480 | 12/1969 | Decker | 84/478 |
| 3,881,390 | 5/1975 | Gullickson | 84/478 |
| 3,976,995 | 8/1976 | Sebestyen | 340/365 R |

*Primary Examiner*—Marshall M. Curtis
*Attorney, Agent, or Firm*—W. Charles Kent

[57] ABSTRACT

A small lightweight electronic device to indicate the note of a keyboard instrument represented by any musical interval in any key. The device has a series of on-off switches representing each of the desired musical keys and a series of switches representing the individual values of musical intervals over a desired range, preferably two octaves. The necessary circuitry is provided between these switches and a keyboard display such that any particular note represented by a musical interval of selected value in a selected key is indicated on the keyboard display. Students and teachers of music for keyboard instruments can, using this device, visualize the location of notes or chords in any key and transpositions of notes or chords from one key to another.

5 Claims, 2 Drawing Figures

ELECTRONIC KEYBOARD DISPLAY DEVICE

BACKGROUND OF THE INVENTION

This invention relates to an electronic device for identifying notes of a keyboard instrument. More particularly, the invention relates to an electronic device which will indicate the note or notes of a keyboard instrument represented by a particular musical interval or intervals in a particular key, and permit easy transposition of the notes represented by such musical intervals from one key to another.

It is understood, from musical theory, that, in a given key of the chromatic musical series, each note has a "value" or "musical interval". For example, in the key of C, the note E has a value or musical interval which is a "major third", while the note G is a "fifth" and the note B is a "major seventh". The note D sharp appearing in the octave above that of the root position of C, in the key of C, is an "augmented ninth", and so forth. Chording in a particular key, accomplished by combinations of notes having particular musical intervals, and the sound and nature of various chords which may be achieved by such combinations, are essential elements in the teaching or study of music, as is the location of particular notes or musical intervals in a given key.

Heretofore, aids for the teaching or study of music have been mainly restricted to mechanical or chart devices such as described in Canadian Pat. No. 710,999 of A. J. Weis, issued June 8, 1965, which describes a type of apparatus which fits behind the keys of a keyboard to identify chords in a particular key, and Canadian Pat. No. 773,425 of Gaillard, issued Dec. 12, 1967, which provides a mechanical apparatus for identifying piano keys with particular tonalities.

In Canadian Pat. No. 831,713 of Schmoier, et al., issued Jan. 13, 1970, a visual keyboard teaching device is described which provides a visual indication, directly on a keyboard instrument, of the comparion manual and clavial keys to be associated to a sound chord triad, and accompanying bass note. Such a device however is relatively sophisticated and expensive to manufacture, requiring association with a real or mock keyboard including keys. Because of its expense and complexity, such a device would not have availability generally for students and teachers of music.

In my co-pending U.S. application Ser. No. 683,860, an economical lightweight electronic device, similar to a pocket calculator, is described which permits identification of chords and notes and chord positions in a particular key using a series of switches representing keys and notes, and associated circuit network, and a display area where a characteristic visual response is provided for each note in a given key. By showing, through the characteristic visual response, the "value" of a particular note in a given key, the operator can readily transpose that note into another key to see what value it would then have. This device, however, does not assist the teacher or student of music in visualizing on a keyboard instrument the location of the notes having the values in question.

It is an object of the present invention to provide a small lightweight electronic device, to be used in music teaching and the like, which permits identification of the position of notes and chords of particular musical intervals (i.e. values), in a particular key, and which enables transposition of and location of such musical intervals readily from one key to another.

SUMMARY OF THE INVENTION

In accordance with the present invention, an electronic device is provided for visually illustrating the note of a keyboard instrument represented by any musical interval in any musical key. The device comprises a series of manually operable on-off key selector switches, one key selector switch associated with each desired key and each key selector switch being exclusively and not simultaneously operable in the "on" position. A series of manually operable on-off musical interval switches is also provided, one interval selector being associated with the value of each desired musical interval and each musical interval selector switch being simultaneously operable with one or more other musical interval selector switches in the on position.

The device has display means electronically associated with the key and musical interval selector switches. The display means consists of a representation of the notes of a keyboard instrument over a particular range, each of the note representations having independent electronically actuated indicator means associated therewith. Circuitry is provided associating the key selector switches, interval selector switches and note indicator means so that the indicator means is actuated corresponding to the note represented in a selected key by a musical interval of selected values. It is preferred that each of the fourteen keys of the chromatic musical series be represented by a key selector switch, and that each of the standard musical intervals over a two octave range by similarly represented by a musical interval selector switch.

As will be explained in more detail subsequently, the device according to the present invention provides an inexpensive, simple and effective tool for teaching music on a keyboard instrument. For example, it gives a student, who has been taught that the root - third - fifth positions are the root position of a major chord in the key of C, by operating the relevant switches on the device, the precise position of this chord in the key of C, for instance through illumination on the display means. By merely changing the key, by pressing another key selector switch, the position of this chord on the keyboard for that new key is immediately indicated. Professional musicians, music arrangers, composers and the like, will also benefit greatly from this device.

BRIEF DESCRIPTION OF THE DRAWINGS

Other objects and advantages of the present invention will become apparent upon reading the following detailed description and upon referring to the drawings in which.

Similar features have been given similar reference numerals in the drawings.

While the invention will be described in connection with an example embodiment, it will be understood that it is not intended to limit the invention to that embodiment. On the contrary, it is intended to cover all alternatives, modifications and equivalents may be included within the spirit and scope of the invention as defined by the appended claims.

DETAILED DESCRIPTION OF THE INVENTION

Figure 1:
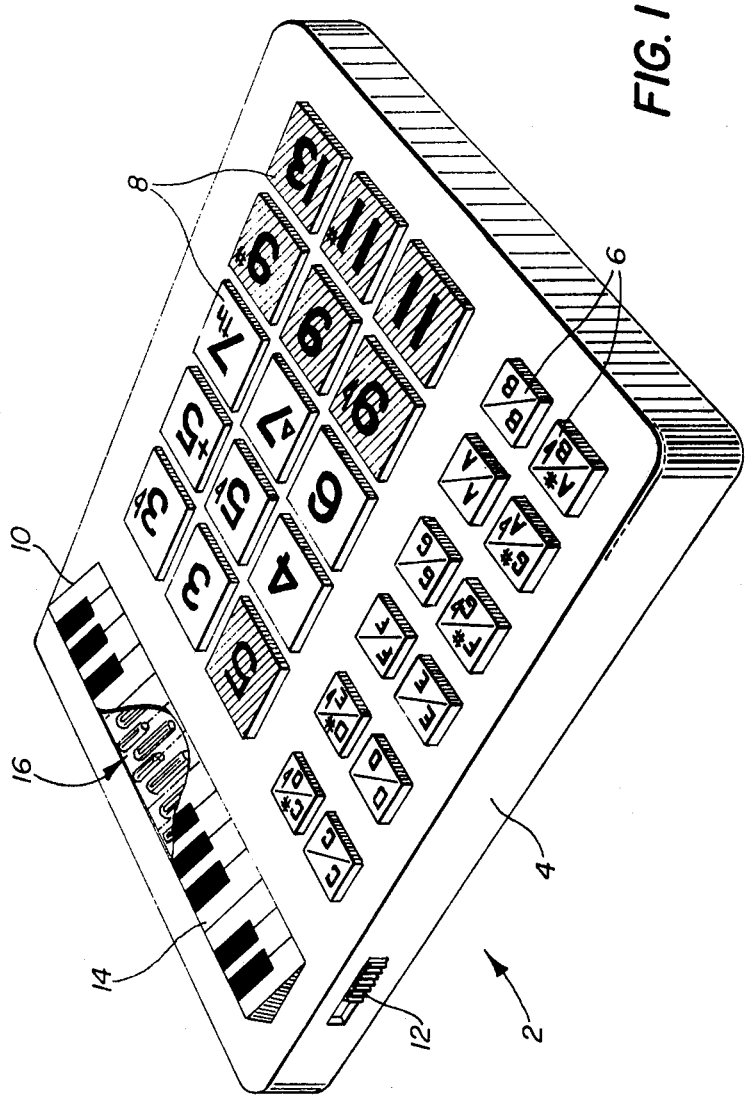
FIG. 1 is a perspective view of an example embodiment of an electronic keyboard display device according to the present invention.

Turning first to FIG. 1, there is shown an electronic display device 2 having frame 4, key selector switches 6, musical interval selector switches 8 and a read-out display means 10. Appropriate key and musical interval notations appear respectively on the key selector switches 6 and musical interval selector switches 8. Of the 12 key selector switches, one switch is provided for each of the 12 keys (or enharmonic values thereof) of the chromatic series. A musical interval selector switch for each standard musical interval over a two octave range of this series is provided in the preferred embodiment so that notes, chords or chord inversions which might extend over more than one octave may be represented.

The musical interval and key selector switches are push-in — push-out switches remaining in pushed in or depressed position after being actuated so that the key or musical interval selected can be readily identified. With this end in mind, the switches can of course alternatively be light-emitting switches, toggle switches, etc. If a light-emitting switch is used, the switch does not stay in a depressed position but instead a light comes on inside the switch to identify the switch which is actuated.

Figure 2:
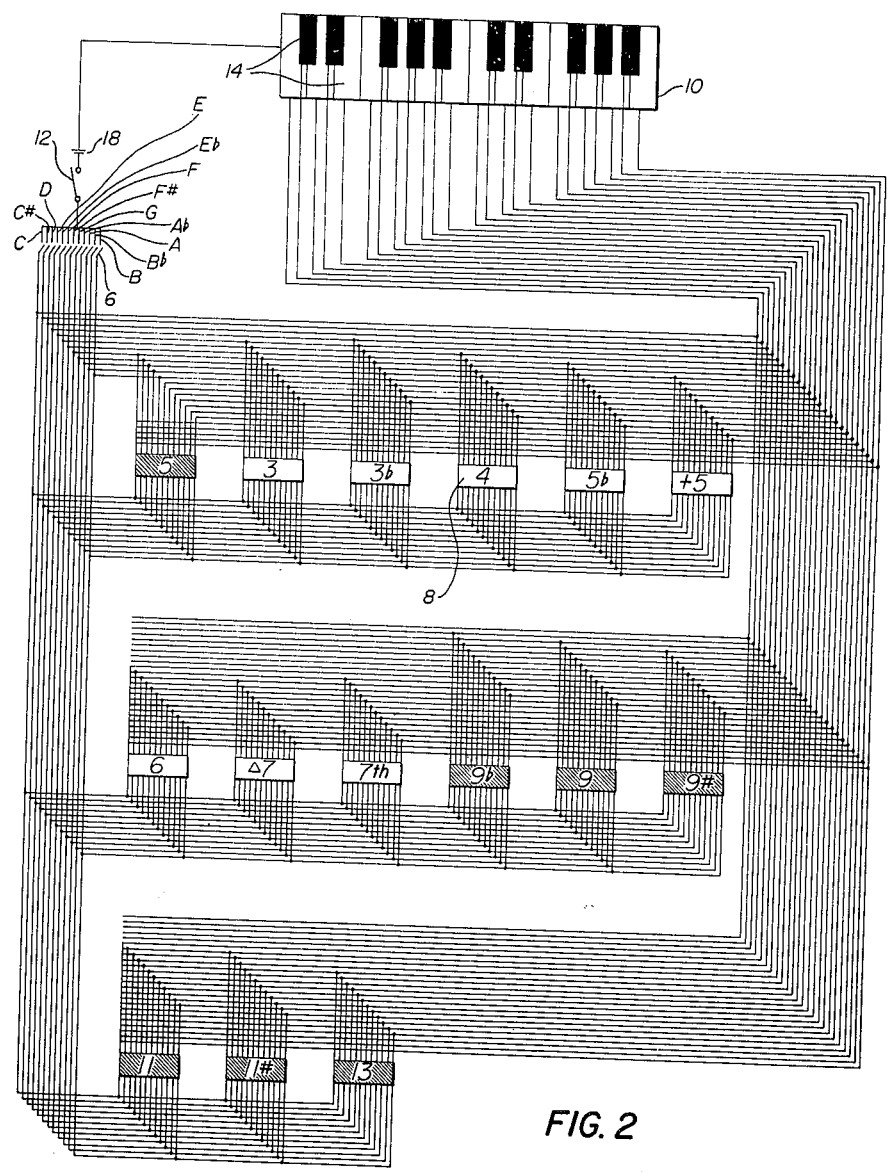
FIG. 2 is an example of a circuit diagram of a circuit network which may be used in a device according to FIG. 1.

As can be seen in FIGS. 1 and 2, each of the keys over an octave range is represented by a key selector switch: C, C# (or D♭), D, D# (or E♭), E, F, F# (or G♭), G, G# (or A♭), A, A# (or B♭) and B. In addition, the following musical intervals and their representative notations are represented by musical interval selector switches 8:

third — 3
diminished third — 3♭
suspended fourth — 4
diminished fifth — 5♭
fifth — 5
augmented fifth — 5
sixth — 6
major seventh — Δ7
seventh — 7
diminished ninth — 9♭
ninth — 9
augmented ninth — 9#
eleventh — 11
augmented eleventh — 11#
thirteenth — 13

Display means 10 as shown consists of a representation of notes 14 of a keyboard instrument over a two octave range. Each of the notes has independently associated with it illumination means 16, e.g. a light bulb, which, when on, illuminates that particular note and no other. The device may have as its power source 18 for example, a 9 volt battery actuated by a main on-off switch 12. Circuitry, a preferred but by no means exclusive example of which is illustrated in FIG. 2, is associated with main switch 12, power source 18, illumination means 16, key selector switches 6 and musical interval selector switches 8 so that when a particular key is selected by pushing the corresponding key selector switch, and a particular musical interval is selected by pushing the appropriate musical interval selector switch 8, the proper illumination means 16 is actuated to indicate on the keyboard representation 14 the particular keyboard note which is represented by that musical interval in that particular key. As can be seen from the circuitry of FIG. 2, when a particular key is selected by pushing a particular key selector switch, the note on the keyboard represented by the root position in that key is illuminated.

The two octave range of display means 10, and associated circuitry as illustrated, is ideally suited for an economical, marketable device. It will be noted from FIGS. 1 and 2 that interval selector switches corresponding to diminished ninth up to thirteenth are shaded. This shading is to indicate to the person who is using the device that the note illuminated by a particular musical interval selected from this group, in a particular key, will be one octave lower than it would normally appear on a keyboard instrument. Of course, a more expensive model might be provided having display means 10 covering a representation of notes over a three or four octave range of a keyboard instrument, and have associated therewith appropriate circuitry and switches so that such re-arranging of the note represented by any particular musical interval will not be necessary. Again, with appropriate additional circuitry of a nature similar to that shown in FIG. 2, whatever further musical interval selector switches thought necessary, such as that representing an eighth, might be added within the spirit of the present invention.

It will be noted again in FIGS. 1 and 2, that the musical interval selector representing a fifth is also shaded for the device in question. A student using such device will be instructed that by pressing both the key selector switch and the shaded fifth musical interval selector switch, a base pattern for the left hand, to accompany the arrangement played with the right hand, with the appropriate transposition of the note represented by the shaded fifth selector one or two octaves lower, can be determined. Thus, a student using the device might be instructed to first determine the notes to be played with the left hand, i.e. by selecting the key and the shaded fifth switches. The relevant notes would be then illuminated to provide an appropriate left hand bass pattern. Then by selecting the rest of the musical intervals for a particular chord, the position of that chord to be played by the right hand will be shown on the display means to the student.

As previously mentioned, each key selector switch 6 is, with respect to the other key selector switches, exclusively and not simultaneously operable in the on position. On the other hand, the musical interval selector switches 8 are simultaneously operable with one or more other musical interval switches in the on position. In this way, at any one particular time, the device will give information about the location of one or more musical intervals (e.g. the location of a chord) in any one particular key. By selecting a different key selector switch for the same musical interval or chord, the location of that chord is shown for that new key. In other words, for one or more musical intervals selected by the appropriate interval selector switches, the notes represented thereby on the keyboard in any particular key may be immediately determined by actuation of the corresponding key selector switch, thus permitting rapid transposition of musical intervals (notes or chords) from one key to another. The value of this operation for instructing and learning musical theory and chording in one key or another on a keyboard instrument will be immediately apparent. Once a student understands the structure of a chord and the fact that all notes have musical intervals or values which vary, depending upon the key in which a note is intended to be played, the device according to the present invention provides a visual diagram of the location on a keyboard instrument of musical intervals representing a particular chord in a particular key. By transposing the chord selected from one key to another using the key selector switches, a student using the device will not only see the location of the chords, but also learn their relevance and formulation.

Using technology already available in miniature pocketsize calculators, such as printed circuitry, the device according to the present invention may be economically and readily constructed and marketed at a cost while would be reasonable even for an individual studying music.

Thus it is apparent that there has been provided in accordance with the present invention an electronic display device that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all alternatives, modifications and variations that fall within the spirit and broad scope of the appended claims.

I claim as my invention:

1. An electronic device for visually illustrating the note of a keyboard instrument represented by any musical interval in any musical key comprising:
    1. a series of manually operable on-off key selector switches, one key selector switch associated with each desired key and each said key selector switch being exclusively and not simultaneously operable in the on position;
    2. a series of manually operable on-off musical interval selector switches, one interval selector switch being associated with the value of each desired musical interval and each of said musical interval selector switch being simultaneously operable with one or more other said musical interval selector switches in the on position;
    3. display means electronically associated with said key and musical interval selector switches, said display means consisting of a representation of the notes of a keyboard instrument over a particular range, each of the note representations having independent electronically actuated indicator means associated with it;
    4. circuitry associated with said key selector switches, interval selector switches and note indicator means to actuate the indicator means corresponding to the note represented in a selected key by a musical interval of selected value.

2. An electronic device according to claim 1, wherein each interval selector switch corresponds to a different musical interval over a two octave range, and wherein each key selector switch corresponds to a different key over an octave range, each of the musical intervals and each of the keys over the respective ranges being represented by a switch.

3. An electronic device according to claim 1, wherein said note indicator means comprises illuminating means, one said illuminating means being associated independently with each of the notes represented on the display means.

4. An electronic device according to claim 1, wherein said circuitry comprises a first circuit network portion comprising a plurality of circuit branches, one branch associated with each key selector switch, each of said circuit branches extending to each of said musical interval selector switches and being exclusively actuated by its associated key selector switch; and a second circuit network portion comprising a plurality of circuit branches, each corresponding to a branch of said first circuit portion at each of said musical interval selector switches and each branch of said second circuit portion extending from each of said musical interval selector switches to said note indicator means, said first and second portions of said circuit network arranged so that an appropriate note indicator means is actuated for a selected key upon selection of a musical interval of particular value.

5. An electronic device according to claim 4, wherein said musical interval selector switch comprises a push-pull switch having a plurality of pairs of contacts, one pair for each pair of cooperating branches of said first and second circuit portions at said musical interval selector switches.

* * * * *